No. 783,521. Patented February 28, 1905.

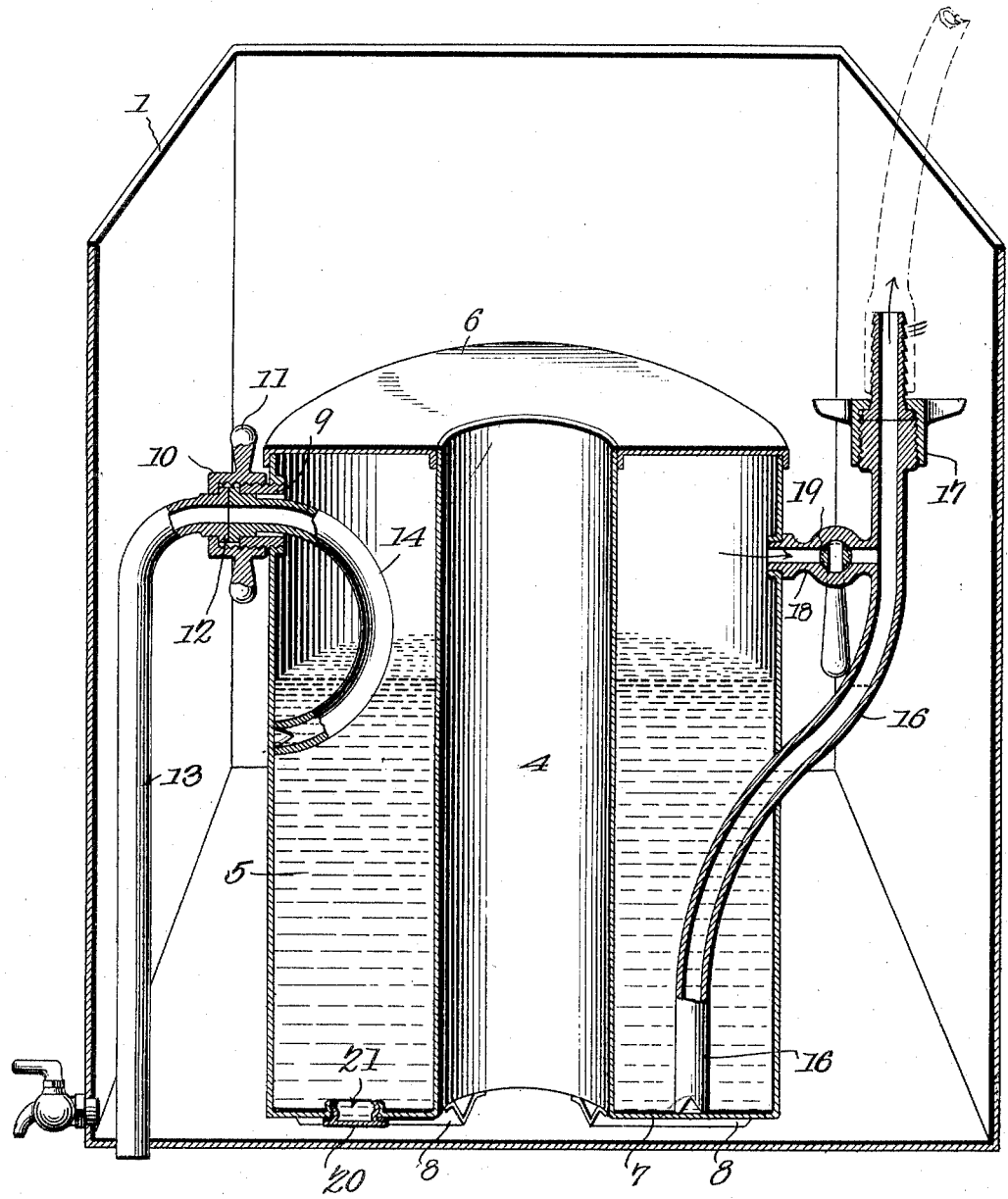

UNITED STATES PATENT OFFICE.

JOSHUA W. HARRIS, OF BALTIMORE, MARYLAND.

BEER-COOLING APPARATUS.

SPECIFICATION forming part of Letters Patent No. 783,521, dated February 28, 1905.

Application filed December 8, 1903. Serial No. 184,343.

*To all whom it may concern:*

Be it known that I, JOSHUA W. HARRIS, a citizen of the United States, residing at Baltimore, in the State of Maryland, have invented a new and useful Beer-Cooling Apparatus, of which the following is a specification.

This invention relates to certain improvements in devices of that class employed for the cooling of beer and other beverages, and has for its principal object to construct a novel form of cooling-tank in which any desired quantity of liquid may be retained in accordance with the demand.

A further and important object of the invention is to provide a cooling-tank which may be readily and thoroughly cleaned.

With these and other objects in view the invention consists in the novel construction and arrangement of parts hereinafter described, illustrated in the accompanying drawings, and particularly pointed out in the appended claim, it being understood that various changes in the form, proportions, size, and minor details of the structure may be made without departing from the spirit or sacrificing any of the advantages of the invention.

The accompanying drawing represents, in sectional perspective, a beer-cooling device constructed in accordance with the invention.

Similar numerals of reference are employed to indicate corresponding parts throughout the drawing.

In the cooling of beer and similar beverages where not drawn directly from the keg or barrel it is usual to pass the liquid through a coil that is covered with ice broken in small pieces; but these coils soon become foul and require constant care and attention. Aside from this, the coils are usually of very small capacity, so that only a small quantity of beer may be maintained in proper condition for drinking.

In carrying out the present invention it is designed to provide a tank into which the beer may flow from the keg or barrel, and this tank is immersed in ice-water, so that the beer will become thoroughly chilled, and in this connection provision is made for adjusting the capacity of the tank or for controlling the amount of beer which it may contain at any one time, so that the bartender may keep any desired quantity of cool beer on hand, in accordance with the demands of the trade, and may readily alter and adjust the quantity of beer in the tank as the demand fluctuates during the day.

In the accompanying drawing, 1 designates a suitable tank or receptacle in which may be placed ice-water, and this tank is preferably provided with one or more cocks through which the water may be withdrawn for drinking purposes.

The beer-containing tank is formed of a pair of concentric cylinders 4 and 5 and upper and lower heads 6 and 7, respectively, the central cylinder 4 forming a free passage for the ice-water, so that the beer contained within the annular tank may be thoroughly cooled. To the bottom piece are secured a number of supporting-feet 8, which may be formed of small strips of metal bent into V-shaped supports and secured to the bottom of the tank by solder or rivets. At one side of the upper portion of the tank is secured a threaded nipple 9 for the reception of a threaded coupling-piece 10, having suitable projecting handles or knobs 11 by which it may be turned. The coupling-sleeve 10 receives the flanged end 12 of a pipe 13, that is connected to the keg, barrel, or other source of supply, and when connected up the beer or other liquid may flow from the source of supply to the cooling-tank. Inasmuch as it becomes necessary to maintain an air-cushion in the upper portion of the tank, it is desirable that the beer discharged into said tank may be at a point somewhat below the liquid-level in order to permit free flow of the beer without frothing, and for this purpose an auxiliary tube 14 is employed. The tube 14 has at its upper end a flange that is seated against the outer end of the nipple and when coupled up the flange is in engagement with the corresponding flange of the inlet-pipe, so that a tight joint may be formed to permit the free flow of the beer without danger of leakage. The tube 14 is curved, practically in semicircular form, so that it may be readily inserted into the tank and is readily withdrawn therefrom when it becomes necessary to clean the tank or the tube. If the tube is rigidly secured in position, effective cleaning will be practically impossible, inasmuch as both the interior and exterior surfaces of the tube become foul. At the opposite side of the tank is a discharge-tube 16, provided at its upper end with a coupling member 17 for connection with a faucet pipe or hose, and the lower end of the tube 16 extends down nearly to the bottom of the tank, so that practically all of the contents of the tank may be withdrawn, the pressure of air in the upper portion of the tank, together with the pressure of air and gas in the keg, serving to force the beer to the faucet.

To form a practical commercial cooler, it is desirable that the capacity of the cooler be adjustable. It is not desirable that more cooled beer should be retained on hand than the demand warrants, and it is also desirable to provide a device which the bartender may adjust to meet the fluctuating demand at different times during the day. For this purpose the upper portion of the tank is connected to the outlet-pipe 16 by means of a tube 18, having a controlling-valve 19, and the opening or closing of this valve controls the volume of air in the upper portion of the tank, and consequently the quantity of beer which may flow into the tank. During the initial filling of the tank the valve 19 must be open to allow the escape of air as the beer flows in through the tube 14. Should it be desired to maintain only a small quantity of beer in the tank, the valve 19 is closed in order to form an extensive air-cushion above the liquid-level, and when the pressure of air equals the pressure of the gas in the keg or barrel no more beer will flow into the tank. When a quantity of beer is withdrawn from the tank through the faucet, an equal quantity will flow from the keg or barrel to the tank until the pressures are again balanced, and in this way a predetermined quantity of beer may be retained in the cooler. Should a larger quantity of beer be desired, the valve 19 is maintained open for a longer period of time and a greater quantity of beer enters the cooler, and in like manner this quantity is automatically replenished immediately after each withdrawing operation.

To permit the thorough cleansing of the interior of the cooling-tank, the latter is provided with a removable cap 20, which may be screwed or otherwise secured to the bottom or other portion of the tank in order to permit access thereto and the removal of any accumulations. In the present instance the bottom of the tank is shown as provided with a flanged opening 21, the flange being threaded for the reception of the removable threaded cap 20.

In devices of this class it is found advantageous to have the connections at the sides of the tank in order to avoid unnecessary bends and elbows in the pipe which connects the tank to the keg or other source of supply, it being usual to retain the keg or barrel in the cellar and to place the cooler in position under the bar. The introduction of the liquid at the side of the tank is permitted in the present instance by curving the inlet-tube practically in semicircular form, and in practice the lower end of the tube will come into contact with the side wall of the cooler, so that the entering liquid will strike against this wall, and owing to the fact that the cooler is surrounded by ice-water and cracked ice the entering fluid will be almost immediately chilled and will sink toward the bottom of the cooler, so that there will be no danger of frothing.

The tanks may be made of any desired size to meet any demands; but for ordinary purposes a standard size will accommodate the requirements of the majority of saloons, inasmuch as the adjustment of the quantity of beer allowed to flow into the tank may be readily controlled by the valve 19.

It will be noted that the lower end of the liquid-inlet tube is notched, so that in the event of accidental contact between the inner mouth of the tube and the side wall of the tank the flow of the beer into said tank will not be interfered with. This might also be accomplished by providing a number of perforations in the tube.

In using devices of this character it will of course be understood that the ice-tank may be large enough to contain any desired number of beer-cooling tanks and that the tanks may be connected in such manner as to permit the ready removal of any one of them for cleansing purposes without disturbing the others.

Having thus described the invention, what is claimed is—

A liquid-cooling device comprising a closed liquid-tank having in its vertical wall an opening for the reception of a threaded nipple, a nipple in the opening, a removable inlet-tube approximately semicircular in form, and extending through the nipple, the lowermost end of the tube having a notched discharge-mouth in contact with the outer wall of the cooler, means carried by the nipple for securing an inlet-pipe thereto, an outlet-tube leading from the lowermost portion of the tank, and a valved vent-pipe connecting the upper portion of said tank to the outlet-tube, substantially as specified.

In testimony that I claim the foregoing as my own I have hereto affixed my signature in the presence of two witnesses.

JOSHUA W. HARRIS.

Witnesses:
J. ROSS COLHOUN,
C. E. DOYLE.